United States Patent [19]

Williams, Jr. et al.

[11] 4,056,720

[45] Nov. 1, 1977

[54] SCANNING POINT SOURCE OPTICAL ENERGY DETECTOR

[75] Inventors: Louis A. Williams, Jr., Cincinnati, Ohio; Joseph D. Miller, N. Lauderdale, Fla.

[73] Assignee: Cincinnati Electronics Corporation, Cincinnati, Ohio

[21] Appl. No.: 665,156

[22] Filed: Mar. 8, 1976

[51] Int. Cl.$^2$ .............................................. G01J 1/20
[52] U.S. Cl. ............................... 250/203 R; 244/3.16; 250/209
[58] Field of Search ............... 250/203, 202, 208, 209, 250/210, 562, 563; 244/3.16; 356/141, 152

[56] References Cited

U.S. PATENT DOCUMENTS

| 2,939,963 | 6/1960 | Rideout | 250/562 |
| 3,311,748 | 3/1967 | Volpe et al. | 250/210 |
| 3,353,022 | 11/1967 | Schwartz | 250/203 |
| 3,657,547 | 4/1972 | Mansfield | 356/141 |
| 3,783,271 | 1/1974 | Abbott et al. | 356/152 |
| 3,944,814 | 3/1976 | Goto | 250/209 |

Primary Examiner—David C. Nelms
Attorney, Agent, or Firm—Lowe, King, Price & Markva

[57] ABSTRACT

A relatively large field of view is scanned to derive an indication of a point source, optical energy emitter being in the field of view, without recognizing relatively large, non-point emitters in the field of view. Each detector in an array of linearly, arranged point source detectors generates an output current in response to the energy irradiating it. The detectors have slightly displaced, narrow fields of view which are scanned so that the field of view of each detector traces a relatively narrow, substantially straight line path across the large field of view. The paths traced by a pair of detectors are substantially parallel and close enough to each other to enable the images of large targets to be indicated as undulations having approximately the same wave shape at substantially the same time positions at the outputs of the pair of detectors. Each of a plurality of negative feedback differential operational amplifiers, one for each pair of detectors, includes complementary input and output terminals which are connected to the detectors so that a point source target illuminating one of the detectors is indicated by the polarity of a pulse output of the amplifier. The inputs of the amplifier are connected to spatially arranged detectors in the array so that the large targets are subtracted in the amplifier and are not indicated in the amplifier output. In response to the output signal of each amplifier, an indication is derived to indicate which of the detectors is responsive to a point source.

15 Claims, 9 Drawing Figures

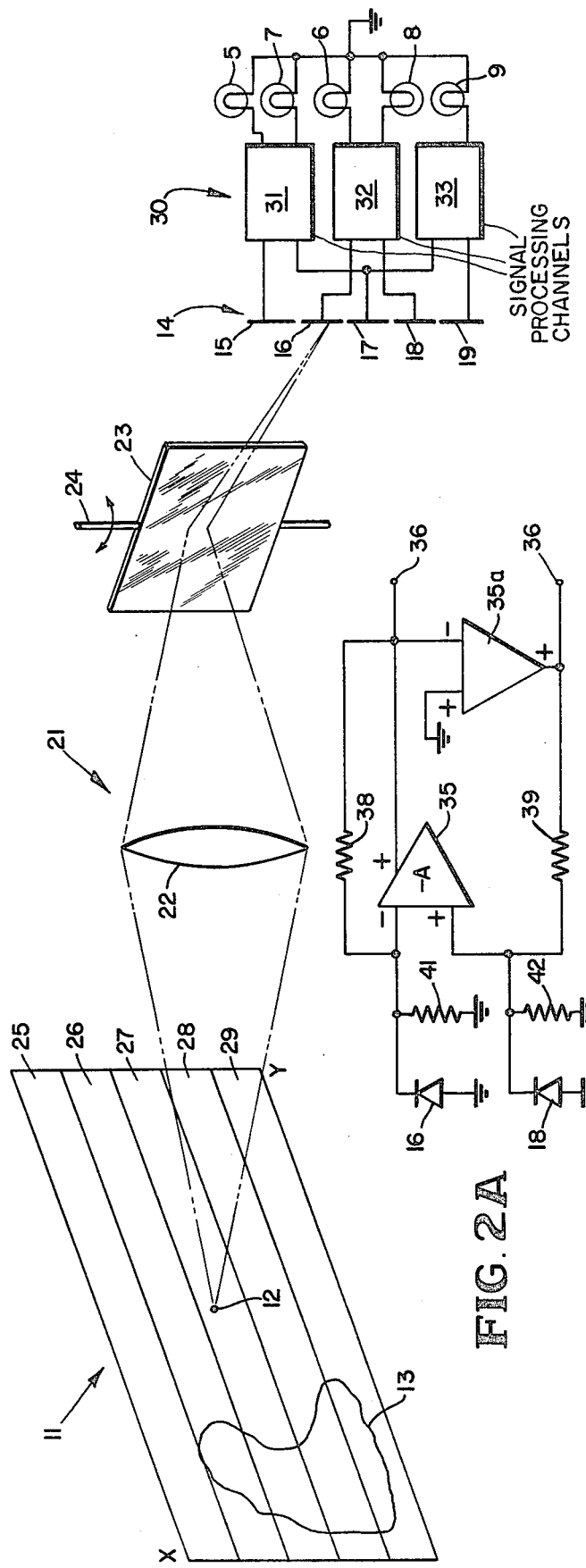
FIG. 1
FIG. 2A
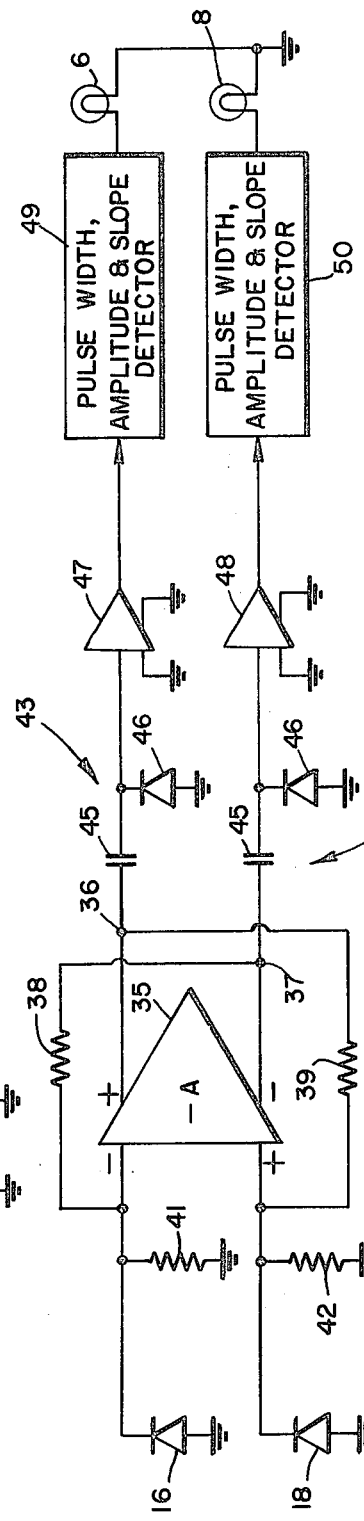
FIG. 2

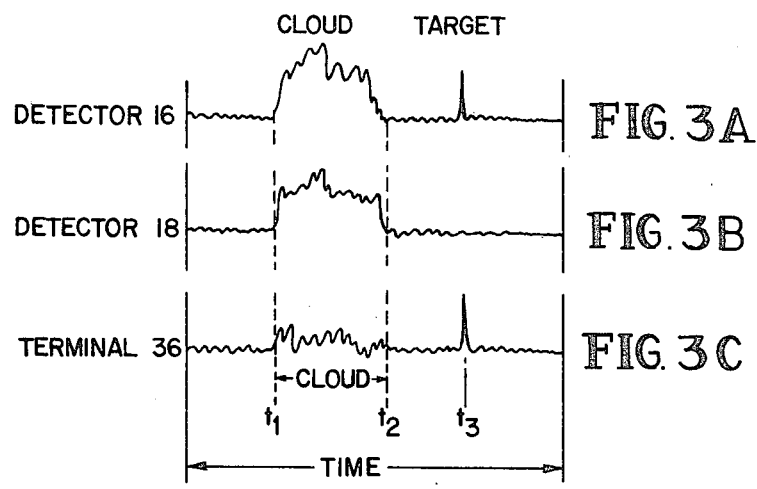
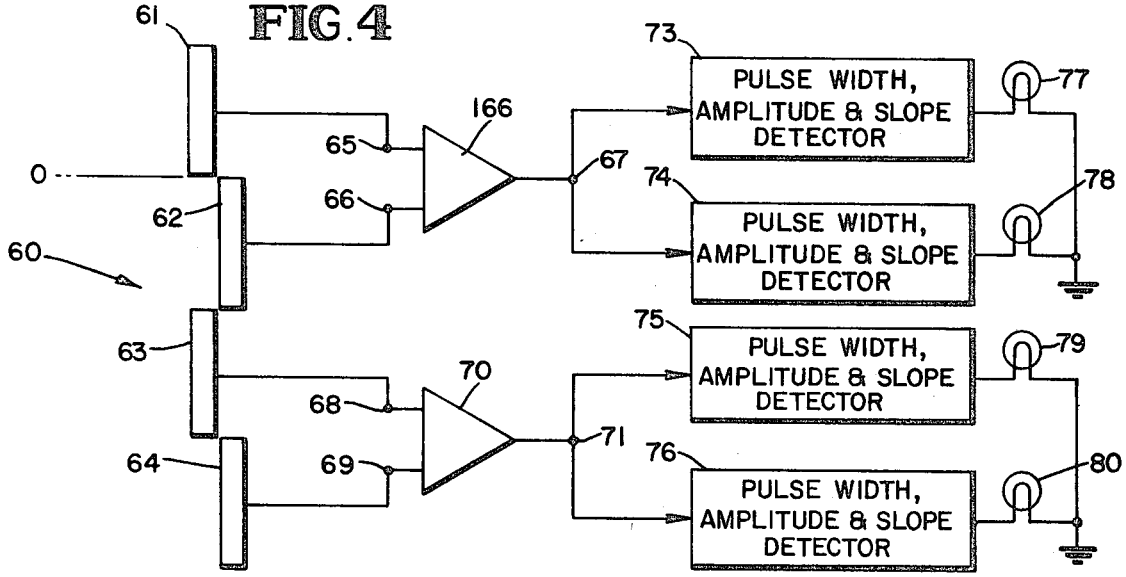
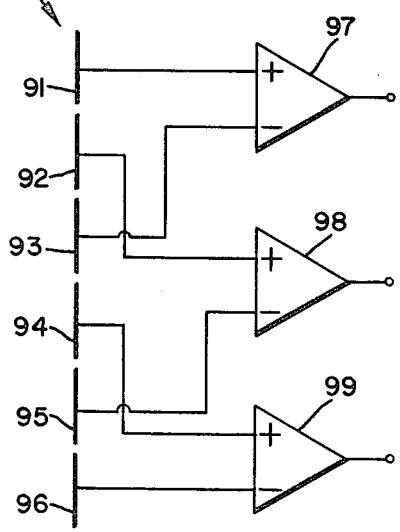
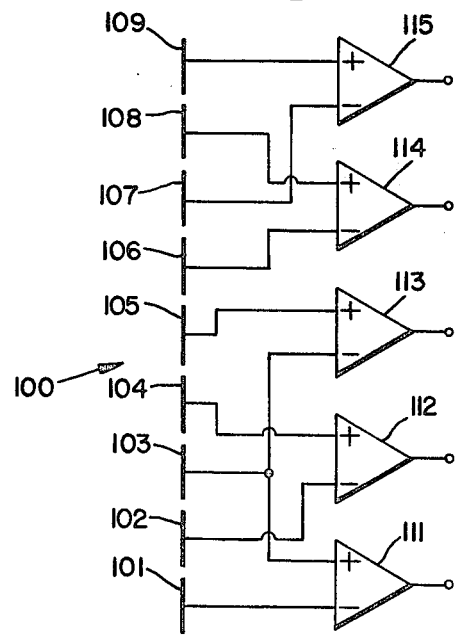

SCANNING POINT SOURCE OPTICAL ENERGY DETECTOR

FIELD OF INVENTION

The present invention relates generally to apparatus for indicating the presence of a point source emitter of optical energy in a relatively large field of view, and more particularly to such an apparatus wherein a large field of view is scanned by a plurality of point source detectors, the outputs of which are supplied to differential amplifiers which derive output signals that are substantially independent of large, non-point source emitters in the field of view.

BACKGROUND OF THE INVENTION

One known apparatus for deriving an indication of a point source emitter of optical energy in a relatively large field of view involves an array of linearly arranged point source detectors. Each of the point source detectors has a width approximately equal to the width of a point source target, as projected by an optical system onto an image plane. In response to optical energy irradiating the point source detector, the detector generates a current that is supplied to a data processing network. To minimize the number of detectors in the array, the detectors have slightly displaced narrow fields of view that are scanned so that the field of view of each detector traces a relatively narrow, substantially straight line path across the large field of view. The paths traced by adjacent detectors are substantially parallel to each other, whereby a series of straight lines is traced by the entire array across the field of view.

In response to a point source irradiating one of the detectors, that detector derives a pulse type output which is coupled via a preamplifier to a signal processing network that is capable of recognizing whether the pulse is in response to a point source emitter. The prior art, in addition to requiring a separate preamplifier for each detector, may erroneously recognize relatively large, non-point source emitters, such as clouds, as point source emitters. While data handling circuits have been designed to distinguish point source from non-point source emitters, these circuits have a tendency to be relatively complex and have not, in all cases, been able to distinguish point source from non-point source emitters.

It is, accordingly, an object of the present invention to provide a new and improved apparatus for enabling point source emitters of optical energy to be detected in a relatively large field of view with an array of point source detectors that is scanned across the field of view.

An additional object of the invention is to provide a new and improved apparatus for detecting a point source emitter in a relatively large field of view with an array of point source detectors that is scanned across the field of view and wherein non-point source emitters have substantially no effect on an output signal derived from preamplifiers connected to the array.

Another object of the invention is to provide an apparatus for indicating the presence of a point source emitter of optical energy in a relatively large field of view wherein the field of view is scanned by an array of point source detectors and there is a substantial reduction in the number of preamplifiers connected to the detectors.

BRIEF DESCRIPTION OF THE INVENTION

In accordance with the present invention, the presence of a point source emitter of optical, infra red energy in a relatively large field of view is determined with an array of at least two point source, infra red sensing, current generating detectors that have slightly displaced fields of view. The field of view of each detector is scanned across the large field of view so that each detector traces a relatively narrow, substantially straight line path across the large field of view. The paths traced by the detectors are substantially parallel to each other; the paths of relatively closely spaced detectors are close enogh to each other to enable the images of large targets to be indicated as undulations having approximately the same wave shape at substantilly the same time positions at the outputs of the detectors. Complementary input terminals of a differential amplifier are connected to pairs of the detectors having closely spaced fields of view so that a single point source is reflected in an output of the amplifier as a pulse. The polarity of the pulse indicates which of the detectors is irradiated by the point source. Because of the substraction process in the differential amplifier and the close spacing of the fields of view of the detectors connected to the complementary inputs of a particular amplifier, the output of the amplifier is substantially independent of and does not reflect the presence of large, non-point source targets in the field of view. The invention has the further advantage of reducing by approximately one half the number of preamplifiers required between the detector array and data handling apparatus that processes the pulses to indicate the location of a point source emitter.

A potential problem with detector arrays of the type with which the present invention is employed is that a point source emitter may lie on a boundary between the fields of view of a pair of adjacent detectors in the array, in which event a pair of adjacent detectors simultaneously derive output pulses. If the adjacent detectors are connected to complementary inputs of a single amplifier, there is a high likelihood of the output of the amplifier cancelling the contributions of the point source illuminating the adjacent detectors. To obviate this possibility the detectors are spatially arranged in an image plane of the field of view and connected to the differential amplifiers in a way that enables an indication of each point source to be derived as a pulse output of an amplifier. In accordance with one arrangement, at least three detectors are arranged in a straight line so that all of them are responsive at any one time to a single line of the image in the scanned field of view. With such a spatial configuration of the detectors, alternate detectors are connected to complementary input terminals of the same differential amplifier; e.g., the first and third detectors of an array are connected to complementary input terminals of a first differential amplifier and the second and fourth detectors of an array are connected to the complementary input terminals of a second amplifier. In accordance with another embodiment, adjacent detectors of the array are spatially staggered across the image plane of the field of view so that they are not simultaneously illuminated by a point source target; the adjacent, spatially staggered detectors are connected to complementary input terminals of the same differential amplifier. Thereby, in response to the adjacent detectors scanning over a single point source target that is common to the fields of view, the differential amplifier to which they are connected sequentially derives oppositely polarized output pulses.

It is, therefore, a further object of the invention to provide an apparatus for detecting the presence of a point source in a relatively large field of view with an array of closely space point source detectors, wherein the detectors are spatially arranged and connected to complementary input terminals of a differential amplifier in such a way as to distinguish a point source lying on a boundary between the field of view of a pair of adjacent detectors.

To provide a relatively low input impedance and stable gain from each differential amplifier and prevent drift of the amplifier output as a function of temperature, each of the amplifiers is provided with a pair of complementary output terminals that are connected in negative feedback paths to the complementary input terminals of the amplifier which are connected to the high impedance, current generating infra red detectors. The negative feedback paths have a tendency to drive the complementary input terminals of the differential amplifier to a virtual ground potential. However, because of the relatively high impedances of the detectors which are connected between the amplifier high impedance input terminals and ground, there is a tendency for the voltages at the output terminals of the differential amplifier to float and become unstabilized with respect to ground. DC stabilization can be attained by connecting resistors between each of the input terminals of the amplifier and ground. Additional DC stabilization occurs by providing an additional ground reference in at least one of the feedback paths.

It is, accordingly, still another object of the invention to provide a new and improved apparatus for indicating the presence of a point source in a relatively large field of view by utilizing an array of at least two current generating detectors connected to complementary input terminals of a differential amplifier, and wherein the amplifier is provided with biasing means to compensate for drift in the output voltage thereof.

The above and still further objects, features and advantages of the present invention will become apparent upon consideration of the following detailed description of several specific embodiments thereof, especially when taken in conjunction with the accompanying drawing.

BRIEF DESCRIPTION OF THE DRAWING

FIG. 1 is a schematic view of the optical and electronic principles of a system in accordance with one embodiment of the present invention;

FIG. 2 is a circuit diagram of a portion of the system illustrated in FIG. 1;

FIG. 2a is a circuit diagram of a variation of the circuit illustrated in FIG. 2;

FIGS. 3A, 3B, and 3C are wave forms generated in the circuit of FIG. 2;

FIG. 4 is a circuit diagram of electronic processing apparatus utilized with a second embodiment including a four detector array in accordance with the present invention; and FIGS. 5 and 6 are partial circuit diagrams of detectors and amplifiers for arrays including six and nine detectors, respectively.

DETAILED DESCRIPTION OF THE DRAWING

Reference is now made to FIG. 1 of the drawing wherein there is illustrated a relatively large field of view 11 including a point source infra red radiation emitter 12 and a relatively large infra red radiation emitter 13, which is typically a cloud, or the like. Infra red radiation sources in field of view 11 illuminate an array 14 including five infra red radiation detecting diodes 15–19, of the type which generate a current in response to infra red radiation impinging on them.

Radiation from field of view 11 is focused on the detectors of array 14 by an optical system 21 including lens 22 and scanning mirror 23. Each of the detectors of array 14 has a relatively narrow field of view in the X (altitude) direction of field of view 11, so that each of the detectors of the array covers a separate horizontal stripe of large field of view 11 as mirror 23 is rotating about vertical axis 24. Detectors 15–19 thereby have slightly displaced, relatively narrow fields of view at right angles to the direction of scan, whereby each field of view corresponds with the stripes 25–29. Detectors 15–19 are positioned so that the field of view of adjacent detectors has a horizontal boundary that corresponds with the boundary between the adjacent stripes 25–29, respectively. Detectors 15–19 extend at right angles to the plane of the sheet of FIG. 1 only for a relatively short distance, corresponding with the image of a point source in the imaged field of view. Thereby, as mirror 23 rotates about axis 24, there is a scanning of point sources in field of view 11 onto the detectors of array 14. For example, in response to mirror 23 being positioned to image point source 12 (in horizontal stripe 27) on array 14, detector 17 derives a pulse, while the remaining detectors of array 14 do not derive a pulse. The pulse subsists for the length of time required for the image of source 12 to traverse detector 17 via the motion of mirror 23. In response to point source 12 lying on a boundary between adjacent stripes, such as the boundary between stripes 27 and 28, pulses are simultaneously derived on the detectors associated with the stripes; for the given example, detectors 17 and 18 simultaneously derive pulses in response to source 12 being imaged by mirror 23 onto the detectors of array 14. The vertical extent of stripes 25–29, as imaged onto detectors 15–19, is such that large radiating sources, such as source 13, simultaneously irradiate three adjacent detectors in array 14 so that the adjacent detectors have substantially the same response. For example, as cloud 13 is being scanned by mirror 23 across array 14, stripes 26, 27, and 28 cause detectors 16, 17, and 18 to derive substantially the same wave forms at any time instant.

The signals generated by the detectors of array 14 are coupled to a data processing network 30 that derives an output signal to indicate which of the detectors is responsive to a point source in field of view 11. To this end, data processing network 30 includes three signal processing channels 31, 32, and 33; in general, for an odd number (N) of detectors, (N+1)/(2) channels are provided, while for an even number of detectors, (N/2) channels are provided. In response to a point source being in the field of view of stripes 25–29, channels 31–33 derive signals to activate indicator lamps 5–9, respectively.

Each data processing channel includes an operational, integrated circuit, D.C., differential preamplifier 35 (FIG. 2) having a positive input terminal connected to one infra red detector and a negative input terminal connected to a second infra red detector.

In the circuit of FIG. 2 wherein there is illustrated data processing channel 32, the positive and negative input terminals of amplifier 35 are respectively connected to infra red detecting diodes 16 an 18, that are spatially separated from each other by diode 17. Amplifier 35 includes complementary output terminals 36 an 37 which are connected in negative feedback loops by resistors 38 and 39 to the negative and positive input terminals of the amplifier to provide signal feedback to maintain the complementary inputs of amplifiers 35 approximately at ground potential. To stabilize the inputs of amplifier 25 at approximately DC ground potential despite drift within the amplifier due to temperature, the positive and negative input terminals of the amplifier are connected via resistors 41 and 42 to ground. Resistors 41 and 42 typically have values of between 10 and 50 megohms to provide the bias stabilization necessary for the high impedance circuits associated with amplifier 35; feedback resistors 38 and 39 typically have values of one megohm, while the resistance of diodes 16 and 18 might vary anywhere from 100 kilohms to 50 megohms. In FIG. 2a there is illustrated substantially the same circuit configuration as FIG. 2, with the exception that complementary output terminal 36 is provided by unity gain, "ground" referenced differential DC amplifier 35A, where the "ground" reference for amplifier 35A is chosen to compensate for other offsets within the circuit illustrated. The function of amplifier 35A may be provided within amplifier 35 in the form of an offset adjustment and/or reference input. If necessary, a DC reference potential can be inserted in the path to the complementary (−) input terminal of amplifier 35 by providing a second unity gain amplifier, similar to amplifier 35A, in a feedback path between the complementary output and input terminals of amplifier 35.

The complementary output signals of preamplifier 35, at terminals 36 and 37, are respectively applied to clamping networks 43 and 44, which include a series capacitor 45 and a shunt diode 46. The voltages developed across diodes 46 of clamping circuits 43 and 44 are respectively supplied to input terminals of D.C. post amplifiers 47 and 48, the outputs of which respectively drive pulse width, amplitude, and slope detectors 49 and 50, preferably of a type disclosed in U.S. Pat. No. 3,898,481 to Harold P. Glaser. In response to detector 16 or 18 responding to a point source, detectors 49 and 50 derive output signals that activate lamp indicators 6 and 8, respectively. In response to detector 16 responding to a point source, positive and negative pulses are simultaneously derived at terminals 36 and 37, respectively. The positive pulse at terminals 36 is coupled by clamping network 43 and amplifier 47 to detector 49 to energize indicator 6. In contrast, the negative pulse at detector 37 is attenuated by clamping circuit 44 and is not coupled by amplifier 48 to detector 50, whereby indicator 8 is not energized. Similarly, in response to detector 18 being irradiated by a point source, negative and positive pulses are derived at output terminals 36 and 37, so that indicator 8 is activated to the exclusion of indicator 6.

Because detectors 16 and 18 are illuminated in approximately the same manner by large sources in field of view 11, such as cloud 13, the output signals at the complementary output terminals of amplifier 35 are independent of the large radiators in the field of view. This conclusion is graphically seen in FIGS. 3A-3C, wherein there are plotted the responses of detectos 16, 18, and the output of amplifiers 35 at terminal 36 for one scan of mirror 23 across field of view 11. As noted from the waveforms of FIGS. 3A and 3B, the responses of detectors 16 and 18 during the interval $(T_1 - T_2)$, while cloud 13 is being scanned, are approximately the same, so that the difference output of amplifier 35, at terminal 36, during this interval is relatively small, as indicated by the undulations in the difference waveform of FIG. 3C during the interval $T_1 - T_2$. In response to detector 16 being illuminated by point source 12, at time $T_3$, however, detector 16 derives a pulse type output, while the output of detector 18 remains relatively constant. The pulse illuminating detector 16 is reflected as a pulse output at terminal 36 of amplifier 35, at $T_3$, as indicated by the waveform of FIG. 3C. The output pulse at terminal 36 at time $T_3$ is supplied to clamp 43, amplifier 47, pulse detector 49, and indicator 6, to enable an operator to be apprised of the presence of point source target 12 in the region covered by stripe 26 at time $T_3$.

The remaining channels of processor 30 include circuitry substantially identical to that illustrated to FIG. 2, but responsive to detectors 15, 17 and 17, 19 to actuate indicator lamps 5, 7 and 9 in response to point sources being in the fields of view of stripes 25, 27 and 29, respectively; however, channel 33 inludes only one clamping circuit, one pose amplifier and one pulse width, amplitude and slope detector (corresponding to elements 44, 48 and 50 of FIG. 2) to actuate indicator lamp 9 in response to detector 19 being irradiated by a point source to derive a positive output pulse at the negative terminal of the differential amplifier.

To prevent a single point source that lies on the boundary between adjacent stripes in the field of view 11 from cancelling each other in the signal processing channels, each of the signal processing channels is responsive to a pair of detectors having noncontiguous fields of view. Hence, in FIG. 1, alternate detectors of array 14 are connected to complementary inputs of a single channel. Detectors 15 and 17 are connected to complementary inputs of the differential amplifier associated with channel 31; detectors 16 and 18 are connected to complementary inputs of the differential amplifier associated with channel 32, and detectors 17 and 19 are connected to complementary inputs of the differential amplifier of channel 33. In response to a pair of adjacent detectors in array 14 being simultaneously irradiated by a point source on a boundary between a pair of stripes 25-29 in field of view 11, an output signal is derived simultaneously from a pair of adjacent channels in the data processor 30. For example, in response to a point source being on the boundary between stripes 26 and 27, detectors 16 and 17 are simultaneously illuminated, whereby a positive pulse is derived on output terminal 36 of the differential amplifier of channel 32, while a positive pulse is derived on the negative output terminal 37 of the differential amplifier of channel 31. In response to the positive pulses derived on the positive and negative output terminals of the differential amplifiers of channels 31 and 32, indicator lamps 6 and 7 are activated to indicate that a point source is on the boundary between stripes 26 and 27.

In accordance with another embodiment of the invention, as illustrated in FIG. 4, the fields of view of adjacent detectors are slightly displaced from each other in the direction of scan (the horizontal or Y direction) and the adjacent detectors are connected to complementary inputs of the same amplifier to enable point sources on a boundary between adjacent stripes 25-29 in field of view 11 to be detected. For the four detector array 60, illustrated in FIG. 4, adjacent detectors 61 and 62 are horizontally displaced from each other, and cooperate with a scanning mirror (not shown in FIG. 4) to cover adjacent horizontal stripes in a large field of view. Similarly, detectors 63 and 64 are displaced from each other in the horizontal direction, but are horizontally aligned with detectors 61 and 62, to cover a further pair of parallel, horizontally extending field of view stripes. The output signals of detectors 61 and 62 are respectively coupled to positive and negative input terminals 65 and 66 of differential amplifier 166, including a single output terminal 67 to which are applied positive and negative pulses in response to irradiation by a point source of detector 61 and 62. Similarly, detectors 63 and 64 are connected to positive and negative input terminals 68 and 69 of differential amplifier 70, having an output terminal 71. Amplifiers 66 and 70 include negative feedback loops and stabilizing resistors, as illustrated for the complementary differential amplifier 35 of FIG. 2; to simplify the drawing, these feedback loops and resistors are omitted in FIG. 4, as well as in the remaining Figures.

The output signal of amplifier 166, at terminal 67, is coupled in parallel to pulse width, amplitude, and slope detectors 73 and 74 which are respectively responsive to positive and negative pulses applied to their inputs. To this end, detectors 73 and 74 are similar to the detectors 49 and 50, but include circuitry so that they respectively handle positive and negative pulses, rather than only positive pulses. Similarly, the output signal of amplifier 70 is applied in parallel to positive and negative pulse width, amplitude, and slope detectors 75 and 76. Detectors 73–76 are respectively connected to drive suitable indicator lamps 77–80.

In response to a point source lying on the boundary between a pair of adjacent horizontal stripes covered by a pair of adjacent detectors in the array of FIG. 4, such as between detectors 61 and 62, detectors 61 and 62 derive positive pulses at spaced time intervals as the field of view is being swept in the horizontal direction, because of the horizontal spacing between the detectors and because each detector has an extent in the direction of scanning, at right angles to the sheet of FIG. 4, equal to a point source image. Thereby, in response to such a point source, positive and negative pulses are derived in sequence at output terminal 67 of amplifier 66; the point source irradiating adjacent detectors 61 and 62 does not produce contributions having a tendency to cancel each other.

In certain situations, the array includes an even number of detectors in horizontal alignment and the field of view of the detectors is such that large radiating sources simultaneously irradiate four adjacent detectors in the array. Such a situation is illustrated with the detector array 90, FIG. 5, wherein detectors 91–96 are horizontally aligned and supply signals through three differential amplifiers 97–99 to three data processing channels (not shown) of the type illustrated in FIGS. 2 or 4. In the configuration of FIG. 5, the positive and negative input terminals of amplifier 97 are connected to be responsive to the signals derived by alternate detectors 91 and 93, while the positive and negative input terminals of amplifiers 99 are responsive to the output signals of alternate detectors 94 and 96. Detectors 92 and 95, which are displaced from each other by detectors 93 and 94, are respectively connected to the positive and negative input terminals of amplifier 98. Thereby, amplifiers 97, 98, and 99 respectively derive positive pulses in response to detectors 91, 92, and 94 being illuminated by point sources; amplifiers 97, 98, and 99 derive negative output pulses in response to detectors 93, 95, and 96 being respectively responsive to point sources.

The principles of FIG. 1, for an array including an odd number of detectors, wherein the center detector 17 supplies an input signal to a pair of channels is not always desirable. For example, in a detector array including nine detectors wherein the number of data processing channels is minimized to five ((N+1)/(2)), the center detector is not connected to a pair of amplifiers. Instead, as illustrated in FIG. 6, the third detector from one end, detecto 103, is connected to a pair of amplifiers, while maintaining the criterion of alternate detectors being connected to complementary input terminals of the same differential amplifier. In array 100, detectors 101–109 are provided for nine horizontally extending, parallel stripes in a scanned field of view. The detectors of array 100 feed five differential amplifiers 111–115 having complementary input terminals, and which drive processing circuitry, of a type illustrated in either FIG. 1 or FIG. 4. Detectors 101–109 are connected to the positive and negative input terminals of amplifiers 111–115 as indicated by the Table so that amplifiers 111–115 derive positive output pulses in response to point sources being detected by detectors 103, 104, 105, 108, and 109, respectively, while point source irradiation of detectors 101, 102, 103, 106, and 107 results in negative pulses being derived from amplifiers 111–115, respectively.

TABLE

| Detector | Connection to terminal of amplifier |
|---|---|
| 101 | − of 111 |
| 102 | − of 112 |
| 103 | + 111, − of 113 |
| 104 | + of 112 |
| 105 | + of 113 |
| 106 | − of 114 |
| 107 | − of 115 |
| 108 | + of 114 |
| 109 | + of 115 |

While there have been described and illustrated several specific embodiments of the invention, it will be clear that variations in the details of the embodiments specifically illustrated and described may be made without departing from the true spirit and scope of the invention as defined in the appended claims.

What is claimed is:

1. Apparatus for indicating that a point source optical radiation emitter exists in a relatively large field of view, said indication being substantially independent of large, non-point source targets in the field of view, comprising first and second point source detectors for generating output currents in response to said radiation irradiating them, means for scanning the fields of view of the detectors so that the field of view of each detector traces a substantially straight line path across the large field of view, said detectors having slightly displaced fields of view in a direction at right angles to the direction of scan, the spacing of the detectors and the paths traced by the detectors being substantially parallel and close enough to each other to enable the images of large targets to be indicated as undulations having approximately the same wave shape at substantially the same time positions at outputs of the detectors while images of point sources are indicated as undulations having different wave shapes at substantially the same time positions at outputs of the detectors, a differential amplifier having complementary input terminals and at least one output terminal, said first and second detectors being respectively connected to said complementary input terminals, D.C. negative feedback paths between the input and output terminals, whereby in response to a point source target irradiating one of said detectors there is derived at one of said output terminals a signal including a pulse having a polarity indicative of which of the detectors is irradiated by the point source target, said signal being substantially independent of large targets, and means responsive to the signal for indicating that the pulse is derived from a point source.

2. The apparatus of claim 1 further including a biasing resistor connected between each of the input terminals and a terminal maintained at a D.C. reference potential.

3. The apparatus of claim 2 further including a terminal maintained at a D.C. reference potential in at least one of the feedback paths.

4. The apparatus of claim 1 further including a terminal maintained at a D.C. reference potential in at least one of the feedback paths.

5. Apparatus for indicating that a point source, optical radiation emitter exists in a relatively large field of view, said indication being substantially independent of large, non-point source targets in the field of view, comprising an array of point source detectors for deriving output currents in response to said radiation irradiating them, means for scanning the fields of view of the detectors so that the field of view of each detector traces a substantially straight line path across the large field of view, said detectors having slightly displaced fields of view in a direction at right angles to the direction of scan, the paths traced by the detectors being substantially parallel to each other, a plurality of differential amplifiers, one for each pair of detectors, each of said amplifiers having complementary input terminals respectively responsive to different ones of said detectors, the spacing of the fields of view of the pair of detectors connected to the complementary input terminals of one amplifier being close enough to each other to enable the images of large targets to be indicated as undulations having approximately the same wave shape at substantially the same time positions at the outputs of the pair of detectors while images of point sources are indicated as undulations having different wave shapes at substantially the same time positions at outputs of the detectors, whereby in response to a point source emitter irradiating one of said detectors there is derived at an output terminal of one of said amplifiers a signal including a pulse having a polarity indicative of which the detectors is irradiated by the point source target, said signal being substantially independent of large targets, and means responsive to the signals derived from the amplifiers for indicating which of the detectors is responsive to a point source.

6. The apparatus of claim 5 wherein said detectors are spatially arranged and connected to the amplifiers so that a point source on a common boundary between the fields of view of a pair of adjacent detectors is indicated as a pulse at an output terminal of at least one amplifier connected to be responsive to the detectors irradiated by the point source on the boundary.

7. The apparatus of claim 6 wherein at least three of said detectors are provided and are linearly aligned in a spatial array, adjacent detectors in the spatial array being connected to input terminals of different ones of said amplifiers.

8. The apparatus of claim 6 wherein N of said detectors are provided, where N is an odd number, and (N+1)/(2) of said amplifiers are provided, one of said detectors feeding two of said amplifiers in parallel.

9. The apparatus of claim 6 wherein N of said detectors are provided, where N is an even number, and (N/2) of said amplifiers are provided.

10. The apparatus of claim 6 wherein adjacent ones of said detectors have their fields of view displaced in the direction of scan so that the adjacent detectors respond at different times to a point source on the boundary, said adjacent detectors being connected to complementary input terminals of one of said differential amplifiers.

11. Apparatus for indicating that a point source optical radiation emitter exists in a relatively large field of view, said indication being substantially independent of large, non-point source targets in the field of view, comprising first and second point source detectors for generating output voltages in response to said radiation irradiating them, means for scanning the fields of view of the detectors so that the field of view of each detector traces a substantially straight line path across the large field of view, said detectors having slightly displaced fields of view in a direction at right angles to the direction of scan, the spacing of the detectors and the paths traced by the detectors being substantially parallel and close enough to each other to enable the images of large targets to be indicated as undulations having approximately the same wave shape at substantially the same time positions at outputs of the detectors while images of point sources are indicated as undulations having different wave shapes at substantially the same time positions at outputs of the detectors, subtracting means having first and second input terminals and an output terminal at which is derived a signal indicative of the difference between the signals at the first and second input terminals, said first and second detectors being respectively connected to said first and second input terminals, whereby in response to a point source target irradiating one of said detectors there is derived at said output terminal a signal including a pulse having a polarity indicative of which of the detectors is irradiated by the point source targets, and means responsive to the signal for indicating that the pulse is derived from a point source and for indicating which of the detectors is illuminated by a point source emitter.

12. Apparatus for indiating that a point source, optical radiation emitter exists in a relatively large field of view, said indication being substantially independent of large, non-point source targets in the field of view, comprising an array of point source detectors for deriving output voltages in response to said radiation irradiating them, means for scanning the fields of view of the detectors so that the field of view of each detector traces a substantially straight line path across the large field of view, said detectors having slightly displaced fields of view in a direction at right angles to the direction of scan, the paths traced by the detectors being substantially parallel to each other, a plurality of subtracting means, one for each pair of detectors, each of said subtracting means having first and second input terminals respectively responsive to different ones of said detectors, and an output terminal for deriving an output signal indicative of the difference between signals applied by the detectors to the first and second input terminals of the subtracting means, the spacing of the fields of view of the pair of detectors connected to the first and second input terminals of one subtracting means being close enough to each other to enable the images of large targets to be indicated as undulations having approximately the same wave shape at substantially the same time positions at the outputs of the pair of detectors while images of point sources are indicated as undulations having different wave shapes at substantially the same time positions at outputs of the detectors, whereby in response to a point source emitter irradiating one of said detectors there is derived at the output terminal of one of said subtracting means a signal including a pulse having a polarity indicative of which of the detectors is irradiated by the point source target, said signal being substantially independent of large targets, and means responsive to the signals derived from the amplifiers for indicating which of the detectors is responsive to a point source.

13. The apparatus of claim 12 wherein said detectors are spatially arranged and connected to the subtracting means so that a point source on a common boundary between the fields of view of a pair of adjacent detectors is indicated as a pulse at the output terminal of the subtractor means connected to be responsive to the detectors irradiated by the point source on the boundary.

14. The apparatus of claim 13 wherein at least three of said detectors are provided and are linearly aligned in a spatial array, adjacent detectors in the spatial array being connected to input terminals of different ones of said subtracting means.

15. The apparatus of claim 13 wherein adjacent ones of said detectors have their fields of view displaced in the direction of scan so that the adjacent detectors respond at different times to a point source on the boundary, said adjacent detectors being connected to the first and second input terminals of one of said subtracting means.

* * * * *